No. 633,029. Patented Sept. 12, 1899.
O. G. NAQUIN.
ROTARY OVEN PLATE.
(Application filed Aug. 16, 1898.)
(No Model.)
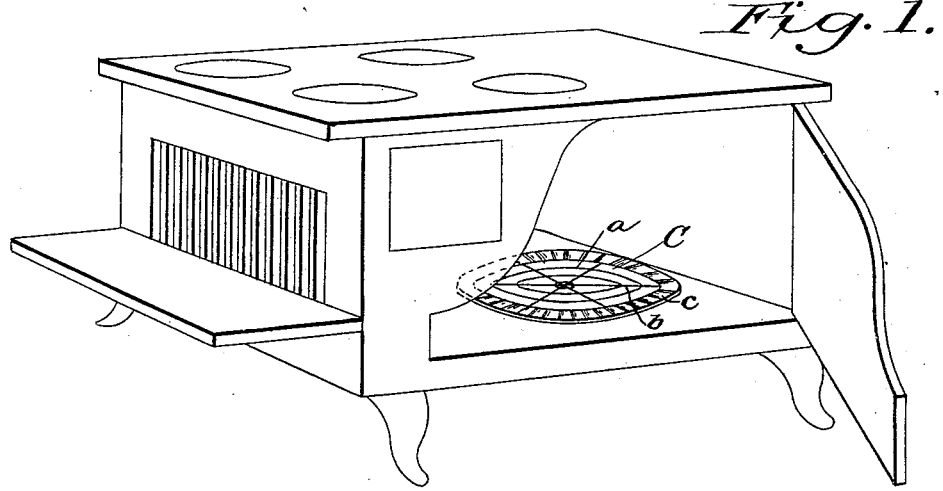
Fig. 1.
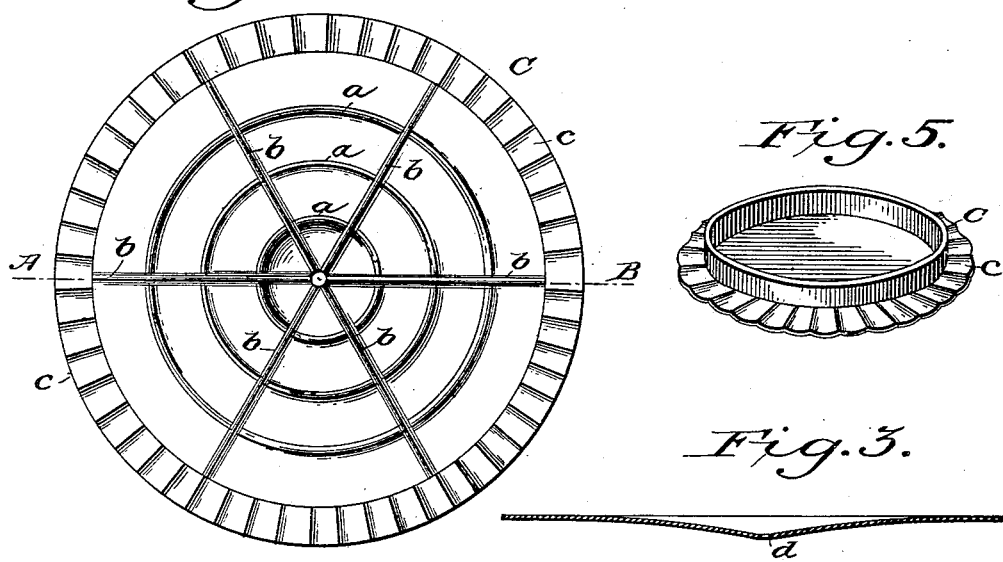
Fig. 2.
Fig. 3.
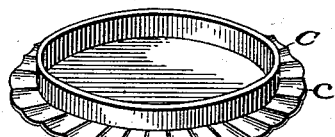
Fig. 5.
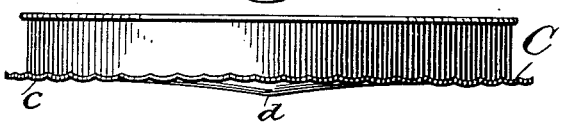
Fig. 4.
Witnesses
A. B. Driggs
M. F. Haskell.
Inventor
Olinda G. Naquin
THE NORRIS PETERS CO., PHOTO-LITHO., WASHINGTON, D. C.

UNITED STATES PATENT OFFICE.

OLINDA G. NAQUIN, OF ROCKPORT, TEXAS.

ROTARY OVEN-PLATE.

SPECIFICATION forming part of Letters Patent No. 633,029, dated September 12, 1899.

Application filed August 16, 1898. Serial No. 688,735. (No model.)

*To all whom it may concern:*

Be it known that I, OLINDA G. NAQUIN, residing at Rockport, in the county of Aransas and State of Texas, have invented a certain new and useful Rotary Oven-Plate, of which the following is a specification.

My invention relates to ovens for baking bread, cakes, pastry, &c., and has for its object to furnish a rotary plate of improved construction adapted to be placed in an oven to receive and support the baking-pan during the process of baking, whereby the operation of baking is facilitated and better results attained.

With this object in view my invention consists in the improved rotary oven-plate hereinafter fully described, the particular points of novelty therein being specifically set forth in the subjoined claims.

In order to enable others skilled in the art to which my invention most nearly appertains to make and use the same, I will now proceed to describe its construction and operation, reference being had to the accompanying drawings, forming part thereof, in which—

Figure 1 is a view illustrating a stove with my invention in use therein. Fig. 2 is a top plan view of a rotary oven-plate constructed in accordance with my invention. Fig. 3 is a central vertical transverse sectional view of the same on the line A B of Fig. 2. Fig. 4 is a view of the same in side elevation with a baking-pan resting thereon. Fig. 5 is a detail perspective view thereof.

Like letters of reference mark the same parts wherever they occur in the various figures of the drawings.

Referring to the drawings by letters, C indicates my improved rotary oven-plate. This will be made of sheet metal stamped into shape and provided with a series of concentric ribs $a$ and a series of radial ribs $b$, extending from the center to the circumference. These ribs are formed on the upper surface, being stamped from the under side, leaving corresponding grooves in the under surface. The plate C is further provided with edge corrugations $c$, extending radially from the outer concentric rib to the circumference of the plate, and a downwardly-extending depression in the center of the plate which forms a projection $d$ below the under surface, extending slightly outside the plane of said under surface and forming a pivotal support upon which the plate may be readily turned during the process of baking.

In the operation of my invention the plate C is placed in the oven and the article to be baked, contained in a suitable pan D, is placed thereon. By means of the ribs upon which the pan will rest the hot air of the oven can circulate between the pan and the plate, such circulation being facilitated by the corrugations around the edge, which also stiffen the plate, and the central projection, forming a pivotal support, will greatly facilitate the turning of the plate, with the pan thereon, whenever required during baking.

The construction and operation of my invention will be readily understood from the foregoing.

The whole structure is light, strong, cheap, and not liable to breakage or rapid wear with ordinary use. The ribs and corrugations not only permit of the free circulation of the heated air of the oven between the pan and plate, but they also stiffen the plate and thus permit of the making of a practical device of this class of sheet metal, whereby its cheapness, ease of manufacture, and quick conduction of heat may be utilized.

Having thus fully described my invention, what I claim as new, and desire to secure by Letters Patent of the United States, is—

1. An oven-plate stamped up of sheet metal, having opposite series of radial and concentric ribs and grooves, and radial corrugations extending from the outer concentric rib to the periphery of the plate, said plate being adapted to be rotated substantially as described.

2. The herein-described rotary oven-plate stamped up of sheet metal, having opposite series of upper radial and concentric ribs and corresponding under grooves, a series of radial corrugations extending from the outer concentric rib and groove to the periphery of the plate, and a centrally-depressed portion, projecting below the plane of the plate and forming a pivotal rest upon which it may be turned, substantially as described.

In testimony whereof I have hereunto set my hand this 30th day of July, 1898.

OLINDA G. NAQUIN.

Witnesses:
E. A. STEVENS,
JOHN E. ELGIN.